United States Patent
Bostedt (10) Patent No.: US 12,449,092 B2
(45) Date of Patent: Oct. 21, 2025

(54) CONDUIT LUBRICATING DEVICE

(71) Applicant: BOSTEDT ENTERPRISES LLC., Green Bay, WI (US)

(72) Inventor: Jonathan Bostedt, Green Bay, WI (US)

(73) Assignee: BOSTEDT ENTERPRISES LLC., Green Bay, WI (US)

( * ) Notice: Subject to any disclaimer, the term of this patent is extended or adjusted under 35 U.S.C. 154(b) by 0 days.

(21) Appl. No.: 18/671,669

(22) Filed: May 22, 2024

(65) Prior Publication Data

US 2024/0392918 A1 Nov. 28, 2024

Related U.S. Application Data

(60) Provisional application No. 63/468,404, filed on May 23, 2023.

(51) Int. Cl.
F16N 21/04 (2006.01)
F16N 7/38 (2006.01)

(52) U.S. Cl.
CPC ............... *F16N 21/04* (2013.01); *F16N 7/38* (2013.01)

(58) Field of Classification Search
CPC . F16N 29/02; F16N 21/04; F16N 7/38; F16N 2210/34; F16N 7/00
USPC ................ 184/15.1, 15.2, 15.3, 14
See application file for complete search history.

(56) References Cited

U.S. PATENT DOCUMENTS

| | | | | |
|---|---|---|---|---|
| 2,735,794 A * | 2/1956 | Pletcher | ............. | F28G 3/163 261/78.2 |
| 3,908,799 A * | 9/1975 | Valeriano | ............. | F16N 3/00 118/DIG. 10 |
| 4,296,837 A * | 10/1981 | Charlton | ............. | H02G 1/08 184/15.1 |
| 4,475,629 A * | 10/1984 | Jonnes | ............. | F16N 7/00 118/205 |
| 4,569,420 A * | 2/1986 | Pickett | ............. | H02G 1/08 254/134.3 R |
| 6,405,998 B1 * | 6/2002 | Griffioen | ............. | G02B 6/52 254/134.3 R |
| 7,174,999 B2 * | 2/2007 | Coder | ............. | H02G 1/086 184/15.1 |

* cited by examiner

*Primary Examiner* — Anna M Momper
*Assistant Examiner* — Mark K Buse
(74) *Attorney, Agent, or Firm* — Lempia Summerfield Katz LLC (57) ABSTRACT

The following disclosure relates to a conduit lubricating device. The conduit lubricating device includes a lubricant reservoir, a hose with a stiffness great enough to enable manual insertion into a populated conduit, yet not so great as to prohibit traversal of the conduit's contours, and a pump fluidly coupled to the lubricant reservoir and the hose.

19 Claims, 5 Drawing Sheets

CONDUIT LUBRICATING DEVICE

CROSS-REFERENCE TO RELATED APPLICATION

This application claims priority to and the benefit of U.S. Application Ser. No. 63/468,404 filed May 23, 2023, and entitled "Conduit Lubricating Device." The entire contents of this prior filed application are hereby expressly incorporated by reference.

FIELD

The present disclosure relates to conduit lubricating devices, and particularly to a conduit lubricating device suitable for directed, localized lubrication of otherwise inaccessible points inside a conduit with wires installed in it.

BACKGROUND

Pulling wires through conduit is a common task for those in the building and maintenance trades. A task that, even under the best conditions, is made difficult by the friction between the relatively small conduit and the sometimes many wires being pulled. Additional problems arise in the maintenance context. When a new wire must be installed into a conduit already containing other wires, the new wire may become tangled or bound up with the existing wires. Additionally, the insulation on old wires, once soft and flexible, becomes brittle and hard. This makes removal of, or installation alongside, such wires very difficult.

Using force alone to overcome these difficulties can damage both the wire being pulled and the conduit in which it is being pulled. The insulation on wires can wear through when rubbed against, particularly when the insulation is old and brittle. This exposes the bare conductor to the environment and creates a potentially dangerous situation. Conduit, similarly, can wear through when continuously rubbed against by a wire being pulled through it, particularly at bends or contours. Wires may also break or become disconnected from the rope or tape being used to pull them if the wire becomes bound and too much force is used to dislodge it. In any of these cases, the result requires the costly and time-consuming replacement of either wire or conduit.

Using lubricants can reduce the friction between a conduit and the wires being installed within it, thus easing the installation process. Devices are known that apply a layer of lubricant to the outside surface of a wire or to the inside surface of a conduit. They are employed either before or during the wire pulling process and are therefore only practicable for new installations. This leaves many wire pulling situations where lubricants cannot be used.

Further, because lubricants are messy and unpleasant, installers often forego their use altogether, even in situations where the known conduit lubricating devices might practically be employed. This leads to situations where installers will begin pulling wire without lubricant, only to find they cannot complete the task without it. They must then either remove the wire and start over with lubricant or push ahead and risk the damaging consequences described above.

SUMMARY

As described herein, due to a variety of common wire pulling tasks where lubricants cannot be effectively employed, a need exists for a conduit lubricating device that can be used for the directed, localized lubrication of otherwise inaccessible high friction points inside a conduit containing wires.

In accordance with a first embodiment of the disclosure, one or more of the above identified needs is met by providing a conduit lubricating device suitable for directed, localized lubrication of otherwise inaccessible points inside a conduit with wires installed in it. The conduit lubricating device includes a lubricant reservoir, a hose with a stiffness great enough to enable manual insertion into a populated conduit, yet not so great as to prohibit the traversal of the conduit's contours, and a pump fluidly coupled to the lubricant reservoir and the hose.

According to another aspect of the disclosure, the conduit lubricating device's hose may have dimensions approximately 0.2-0.3 inch in the outer diameter (OD) and may have dimensions approximately 0.1-0.175 inch in the inner diameter (ID), and a stiffness that is sufficient to bend as wire is fed therethrough, yet not yield or permanently deform. The hose may advantageously have a 0.25 inch OD and a 0.142 inch ID. The hose may have a length of at least twenty-five, fifty, or one hundred feet. The conduit lubricating device's pump may be manually operated, or powered, e.g., electrically operated, or pneumatically operated. The conduit lubricating device may further include a spool adapted for storing and deploying the conduit lubricating device's hose, and the spool may include a handle or an outer housing.

In another embodiment, the conduit lubricating device includes a lubricant reservoir, a hose, a pump, and a spool. The hose has a diameter of less than 0.5 inch (OD), a length of at least fifty feet, and in some cases more than one-hundred feet, and a stiffness great enough to enable manual insertion into a populated conduit, yet not so great as to prohibit the traversal of the conduit's contours. The pump is manually operated and has an inlet, fluidly coupled to the conduit lubricating device's lubricant reservoir, and an outlet, fluidly coupled to the conduit lubricating device's hose. The spool is adapted for storing and deploying the conduit lubricating device's hose and has a handle and an outer housing.

In yet another embodiment, the conduit lubricating device includes a reservoir, a hose, and a pump fluidly coupled to the hose and the reservoir.

According to other aspects of this embodiment, the conduit lubricating device may include a spool. The conduit lubricating device's pump may be manually or electrically operated. The conduit lubricating device's hose may have a length of at least fifty feet or at least one hundred feet, and it may have a stiffness great enough to enable manual insertion into a populated conduit, yet not so great as to prohibit the traversal of the conduit's contours.

Various other features, embodiments, and alternatives of the present disclosure should be apparent from the following detailed description taken together with the accompanying drawings. It should be understood, however, that the detailed description and specific examples, while indicating some of the embodiments of the disclosure, are given by way of illustration and not limitation. Many changes and modifications could be made within the scope of the present disclosure without departing from the spirit thereof, and the present disclosure includes all such changes and modifications.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The embodiments of the disclosure are illustrated in the accompanying drawings, in which like reference numerals represent like parts throughout, and in which.

While the disclosed devices and methods are representative of embodiments in various forms, specific embodiments are illustrated in the drawings (and are hereafter described), with the understanding that the disclosure is intended to be illustrative and is not intended to limit the claim scope to the specific embodiments described and illustrated herein.

DETAILED DESCRIPTION

The present disclosure and the various features and advantageous details thereof are explained more fully with reference to the non-limiting embodiments described in detail in the following description.

Terms used in the specification such as "first," "second," and the like, may be used to describe various components, but the components are not to be interpreted as limited by the terms. The terms are used only to distinguish one component from another component. For example, a first component may be named a second component and the second component may also be similarly named the first component, without departing from the scope of the present disclosure. The term "and/of" includes a combination of a plurality of related described items or any one of the plurality of related described items.

Terms used in the present specification are used only in order to describe specific embodiments rather than limiting the present disclosure. Singular forms are intended to include plural forms unless the context clearly indicates otherwise. It should be further understood that the terms "comprises" or "have" and the like used in this specification specify the presence of stated features, steps, operations, components, parts mentioned in this specification, or a combination thereof. Such terms do not preclude the presence or addition of one or more other features, numerals, steps, operations, components, parts, or a combination thereof.

Unless indicated otherwise, it should be understood that all the terms used in the specification including technical and scientific terms have the same meaning as those that are generally understood by those having ordinary skill in the art. Terms generally used and defined by a dictionary should be interpreted as having the same or consistent meanings as those within a context of the related art. Such terms should not be interpreted as having ideal or excessively formal meanings unless being clearly defined otherwise in the present specification.

When a component, device, element, unit, member, or the like of the present disclosure is described as having a purpose or performing an operation, function, or the like, the component, device, element, member, or unit should be considered herein as being "configured to" meet that purpose or to perform that operation or function.

Figure 1:
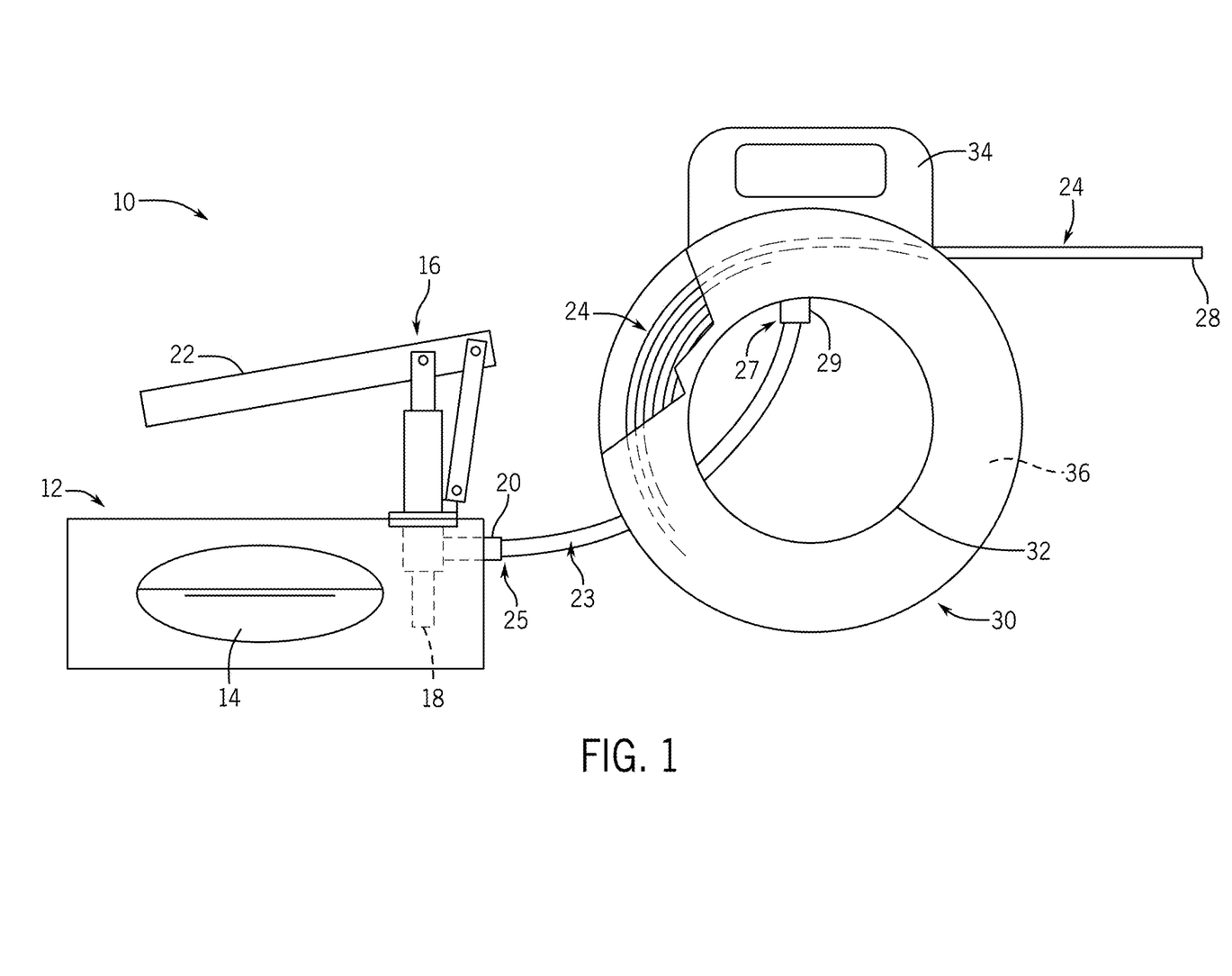
FIG. 1 is a partially sectioned side view of the conduit lubricating device, including a lubricant reservoir, a pump, a hose, and a spool, according to an embodiment of the present disclosure.

Referring now to the drawings, FIG. 1 is a partially sectioned side view of the conduit lubricating device, including a lubricant reservoir, a pump, a hose, and a spool, according to an embodiment of the present disclosure. As shown in FIG. 1, a conduit lubricating device 10 (or conduit lubricator) includes a reservoir 12 suitable for storing an amount of lubricant 14. The lubricant 14 may be a petroleum-based lubricant or a synthetic polymer-based lubricant. Alternatively, the lubricant 14 may be any fluid capable of reducing friction between solid surfaces.

The conduit lubricator 10 also includes a pump 16. In one embodiment, the pump 16 is affixed to the lubricant reservoir 12, but other configurations are contemplated. The pump 16 has an inlet 18 and an outlet 20. The inlet 18 is fluidly coupled to the lubricant reservoir 12 so that the lubricant 14 stored in the reservoir 12 can enter the pump's inlet 18. In one embodiment, the pump 16 is manually operated by actuating its handle 22. The pump 16 may alternatively be powered, e.g., electrically operated, pneumatically operated, or otherwise operated by any means known to actuate a pump.

The conduit lubricator 10 further includes a hose 24 for transporting the lubricant housed in a spool 30. Lubricant travels from the reservoir 12 to a hydraulic style hose 23 having a first end 25 coupled to the reservoir 12 via an outlet coupling 20, and a second end 27 coupled to the spool 30 via a spool inlet 29. The hydraulic hose 23 is more durable and more resistant to kinking than the hose 24. The inlet end of the hose 24 is fluidly coupled to the inlet 29 of the spool 30, while an output end 28 of the hose 24 is used to deposit lubricant at a location of interest. The hose 24 has a stiffness great enough to enable insertion (e.g., manual insertion) into a populated conduit, yet not so great as to prohibit the traversal of the conduit's contours. The hose 24 may have a stiffness sufficient for feeding in the conduit without collapsing, but not so stiff to not be able to navigate the conduit. In other words, the hose is rigid enough to allow being fed into the conduit without collapse and flexible enough to allow the hose to move along (i.e., through) the conduit. The hose 24 may have a diameter of less than 0.5 inch (outer diameter) and 0.25 inch inner diameter. The hose 24 may have a length greater than twenty-five feet. Particularly, the hose 24 may have a length greater than fifty feet. Even more particularly, the hose 24 may have a length greater than one hundred feet.

As mentioned above, the conduit lubricator 10 includes spool 30 for storing and deploying the hose 24. The spool 30 includes a cylindrical structure 32 with an outer surface around which the hose 24 may be wound. The spool 30 may include a handle 34 for a user to hold while winding or unwinding the hose 24 or to use while transporting the conduit lubricating device 10. The spool 30 may also include an outer housing 36 to aid in securing, protecting, and managing the spooled hose 24.

Figure 2:
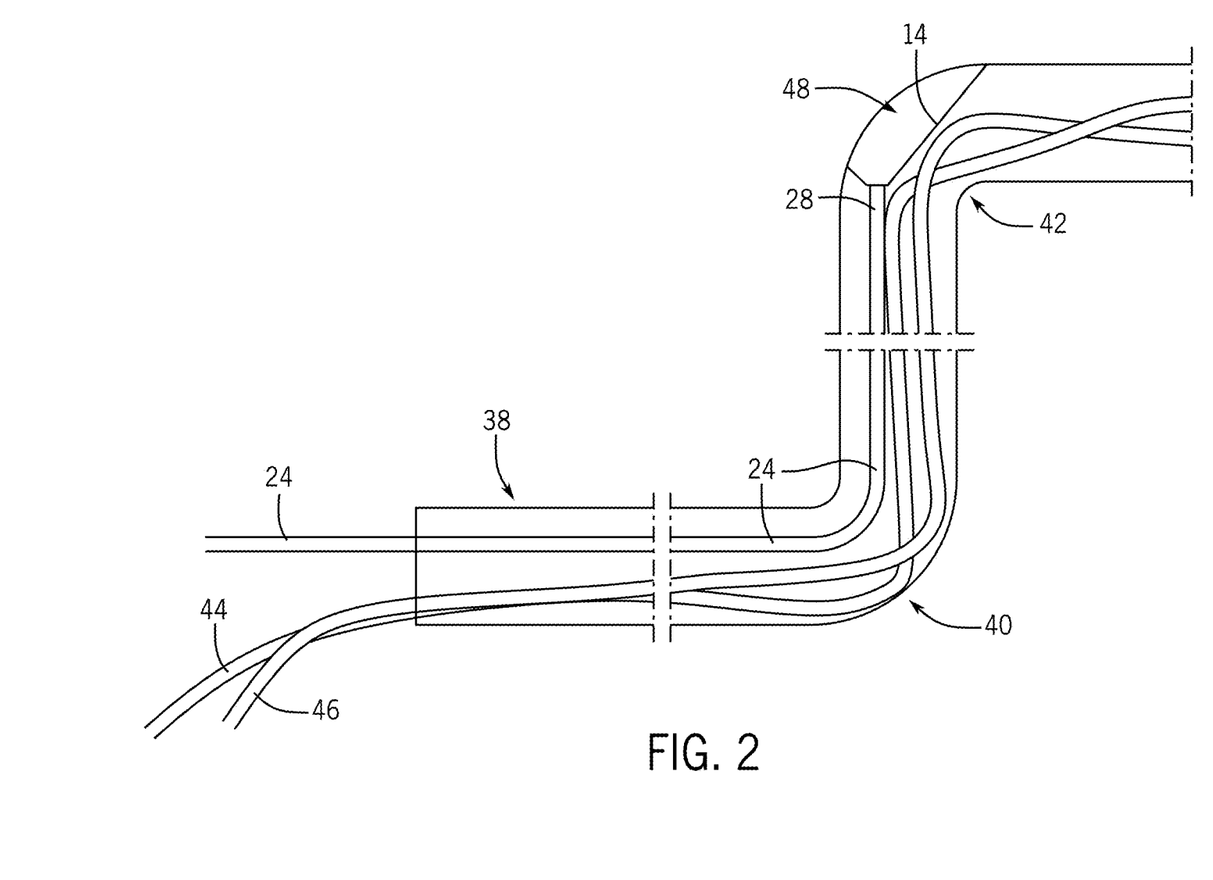
FIG. 2 is a sectional view of the conduit lubricating device's hose, inserted into a contoured and populated conduit, according to an embodiment of the present disclosure.

Turning next to FIG. 2, FIG. 2 is a sectional view of the conduit lubricating device's hose, inserted into a contoured and populated conduit, according to an embodiment of the present disclosure. The use of the conduit lubricating device 10 is illustrated in FIG. 2. The hose 24 is manually inserted into a conduit 38 with the depositing end 28 leading. The conduit 38 is illustrated with two ninety-degree bends 40, 42, but the conduit 38 may have any number of bends at any angle. As illustrated in FIG. 2, the conduit 38 has two wires 44, 46 installed in it, but the conduit 38 may have any number of wires installed in it. The hose 24 is inserted past the already installed wires 44, 46 and around the ninety-degree bend 40 in the conduit 38 so that the depositing end 28 of the hose 24 is positioned at the desired spot 48 for lubricating near the second ninety-degree bend 42.

With the hose 24 inserted into the conduit 38 such that the depositing end 28 is positioned at the desired location 48 for lubrication, the pump 16 is actuated by the user to force lubricant 14 from the lubricant reservoir 12 through the pump 16 to the desired location 48. In other words, the lubricant 14 is supplied from the inlet 18 to the outlet 20, and through the hydraulic hose 23 and hose 24 (i.e., from the inlet end 25 of hydraulic hose 23 to the depositing end 28 of hose 24) to the desired location 48 for lubrication. The lubricant 14 is applied around the desired location 48 to reduce the friction between the wires 44, 46 and the conduit 38 at that location 48 to aid in the installation of additional wires or the removal of already installed wires 44, 46. In this way, the depositing end 28 of the hose 24 is used to apply lubricant 14 at specific locations, such as the desired location 48. In some embodiments, the depositing end 28 of the hose 24 may be configured to use a directional spray to apply the lubricant 14.

Figure 3:
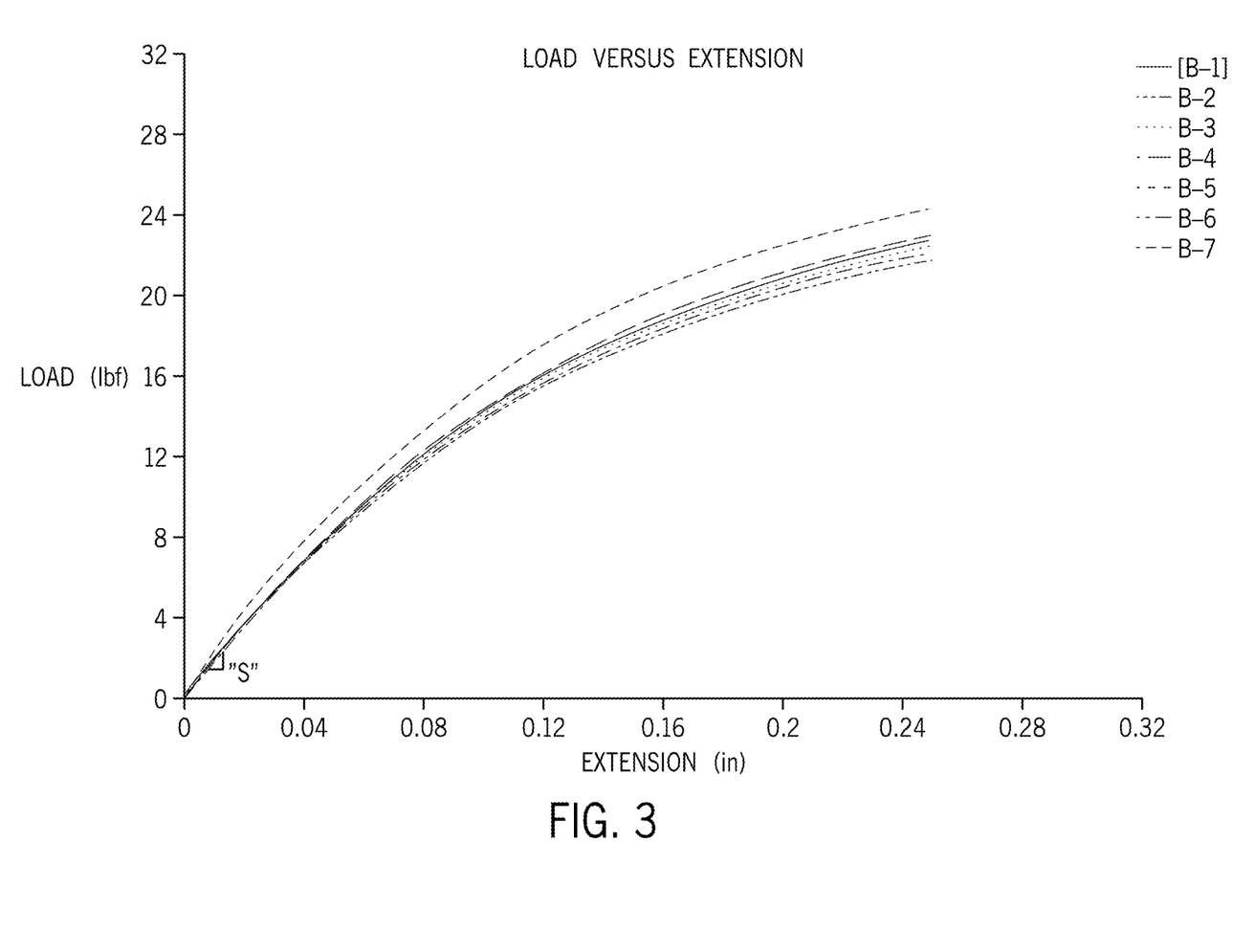
FIG. 3. is a graph illustrating a force chart (bending test) for a tube according to an embodiment of the present disclosure.

The properties of the hose (i.e., a tube) 24 are important. Particularly, the tube is made of nylon, but equivalent alternatives may be employed. In one implementation, the outer diameter (OD) of the hose is 0.25 inch while the inner diameter (ID) is about 0.142 inch. With reference to FIG. 3, various hose designs underwent bending tests at room temperature, with the average and standard deviation of the bending analyzed. A three-point bending fixture was used for ASTM D790. The tubes were located along the anvils of the fixture at a span of 1.75 inches. The tubes underwent a total displacement of 0.25 inch due to bending, which is equivalent to the nominal diameter. The bending test was conducted at a rate of 0.002 in/s. The average slope of the bending force (load in lb.-ft.) vs. displacement (extension in inches) curve on the elastic region was measured, along with the load at ½ the diameter of displacement.

FIG. 3. is a graph illustrating a force chart (bending test) for a tube according to an embodiment of the present disclosure. As illustrated in FIG. 3, the tube has the properties shown in which the slope "S" of the force vs displacement curve or "average slope" can be determined at each point. The slope "S" shown is at the starting slope of the curve. However, the slope is not constant like it would be in a spring. The slope is constantly reduced as the tube is further bent. Tube selection is important. In one embodiment, a tube exhibiting bending (with an average slope of the curve) ranging from greater than 50 pound-foot per inch (lb-ft./in.) to less than 300 lb-ft./in., specifically about 224.5 lb-ft./in, with a standard deviation ranging from greater than 3.0 to less than 125, particularly 8.780, and an average load at 0.125 inch (half the diameter of displacement) ranging from greater than 4 lb-ft. and less than 20 lb-ft., specifically about 16.0 lb-ft. (average load), with a standard deviation of the load at 0.125 inch ranging from greater than 0.5 to less than 1.0, particularly 0.709, is advantageous.

Figure 4:
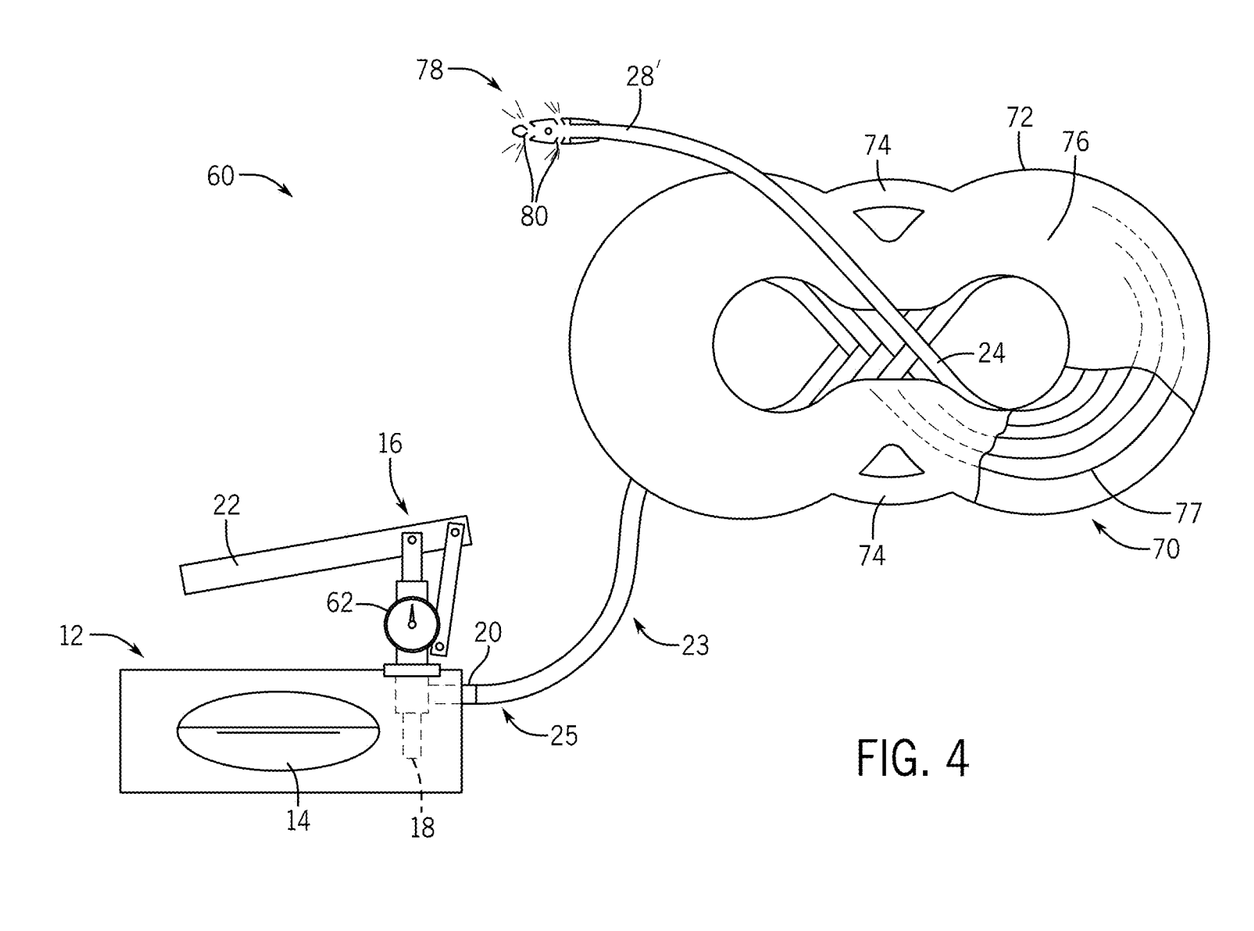
FIG. 4 is a partially sectioned side view of a pump and a top view of a conduit lubricating device, according to an embodiment of the present disclosure.

FIG. 4 is a partially sectioned side view of the conduit lubricating device, including a lubricant reservoir, a pump, a hose, and a spool, according to an embodiment of the present disclosure. Referring to FIG. 4, an alternate embodiment of a conduit lubricating device 60 has similar components to lubricator device 10, including a reservoir 12 suitable for storing an amount of lubricant 14. The lubricant 14 may be a petroleum-based lubricant or a synthetic polymer-based lubricant.

The conduit lubricator 60 also includes a pump 16. In this embodiment, the pump 16 is affixed to the lubricant reservoir 12, and includes a gauge 62 to monitor pressure. Pump 16 has an inlet 18 and an outlet 20. The inlet 18 is fluidly coupled to the lubricant reservoir 12 so that the lubricant 14 stored in the reservoir 12 can enter the pump's inlet 18. In one embodiment, the pump 16 is manually operated by actuating its handle 22. Similar to device 10, pump 16 may alternatively be powered, e.g., electrically operated, pneumatically operated, or otherwise operated by any means known to actuate a pump.

The conduit lubricator 60 further includes a hose 24 housed in a container 70. The hose 24 has an inlet end and a depositing end 28'. Particularly, a separate hose 23, such as a hydraulic hose 23 having a first end 25, is fluidly coupled to the outlet 20 of the pump 16 so that the pump 16 can move lubricant 14 through the hose 23, and to the primary hose 24 housed in the container 70. Ultimately, lubricant is applied at the location of the hose's depositing end 28'. The hose 24 has a stiffness great enough to enable manual insertion into a populated conduit, yet not so great as to prohibit the traversal of the conduit's contours. Similar to the previous embodiment, hose 24 has a stiffness sufficient for feeding in the conduit without collapsing, but not so stiff to not be able to navigate the conduit.

The conduit lubricator 60 includes a spool housing/container 70 for storing and deploying the hose 24. Container 70 includes a figure-eight structure 72 with an outer surface around which the hose 24 may be wound. The figure-eight design of the spool container 70 in this embodiment facilitates ready feeding and dispensing of hose 24, reducing entanglements. Moreover, in this embodiment (but equally adaptable to lubricator 10), the dispensing end 28' of hose 24 includes a nozzle 78 having a parabolic shape and angled dispensing openings 80 for more efficient and even distribution of lubricant during use.

The spool container 70 may also include handles 74 for a user to hold while winding or unwinding the hose 24 or to use while transporting the conduit lubricating device 60. Spool container 70 also includes an outer housing 76 to aid in securing, protecting, and managing the stored hose 77.

Figure 5:
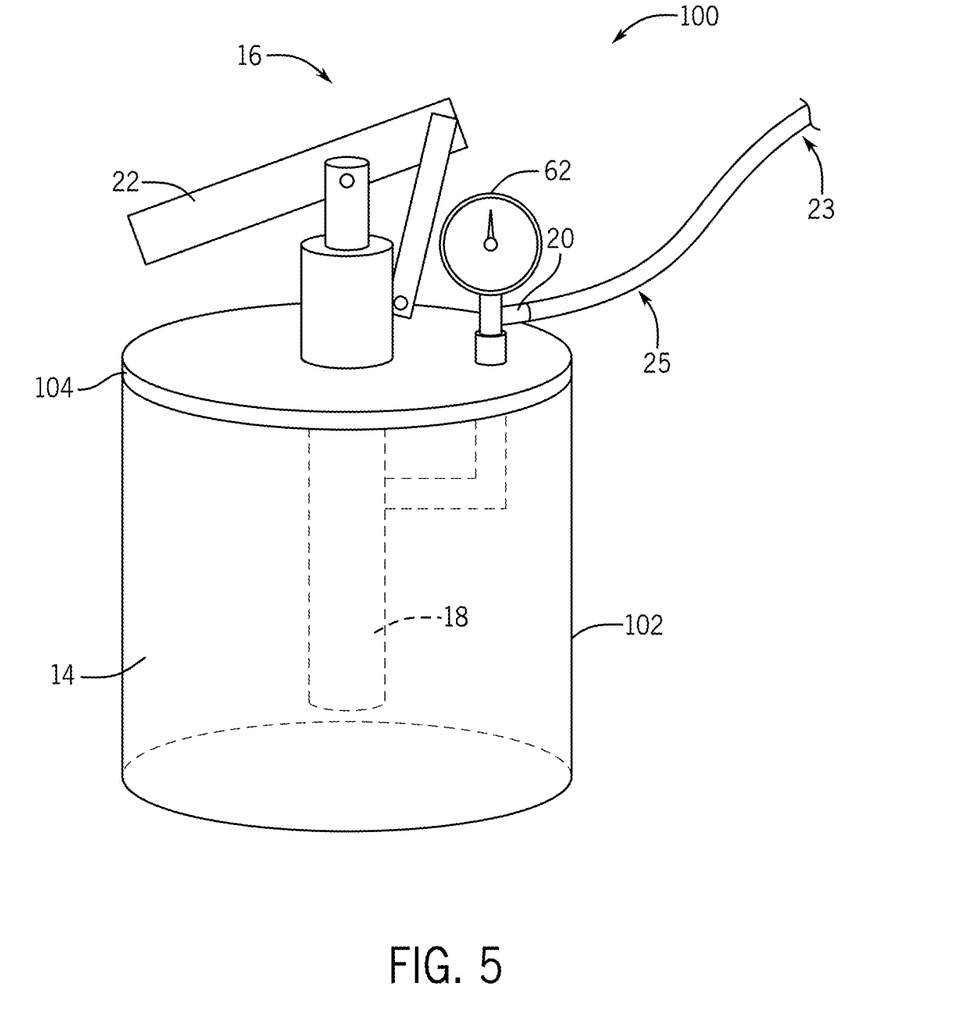
FIG. 5 is a schematic view of a conduit lubricating device according to an embodiment of the present disclosure, with a bucket reservoir.

FIG. 5 is a schematic view of a conduit lubricating device according to an embodiment of the present disclosure, with a bucket reservoir. Turning to FIG. 5, an alternate conduit lubricator device 100 is adapted to be more portable and used with standard equipment found on construction sites. Lubricator 100 includes a pump 16, similar to previous embodiments, mounted to a base 104 adapted for ready attachment to a user-supplied lubricant reservoir. In this case, pump 16 and its attached components can be affixed to a reservoir 102, for example, a standard five gallon bucket, with base 104 provided with clamps or a lid having a perimeter rim structure with spring properties for snapping to the reservoir (e.g., a bucket) 102. Similar to previous embodiments, reservoir 102 is suitable for storing an amount of lubricant 14 which again may be a petroleum-based lubricant or a synthetic polymer-based lubricant, for example.

Pump 16 also includes a gauge 62 to monitor pressure. Pump 16 has an inlet 18 and an outlet 20. The inlet 18 is fluidly coupled to the lubricant reservoir 102 so that the lubricant 14 stored in the reservoir 102 can enter the pump's inlet 18. In one embodiment, the pump 16 is manually operated by actuating its handle 22. Similar to device 10, pump 16 may alternatively be powered, e.g., electrically operated, pneumatically operated, or otherwise operated by any means known to actuate a pump.

Similar to previous embodiments, conduit lubricator 60 further includes a primary depositing hose (not shown in FIG. 5, but similar to hose 24) for depositing lubricant at a location of interest. A separate hydraulic hose 23 is provided to transport lubricant from reservoir 102 to the primary depositing hose (e.g., 24 in FIG. 1) using pump 16 to lubricate at a desired location from the hose's depositing end. Again, the depositing hose in this embodiment is similar to the others in that it has a stiffness great enough to enable manual insertion into a populated conduit, yet not so great as to prohibit the traversal of the conduit's contours, i.e., a stiffness sufficient for feeding in the conduit without collapsing, but not so stiff to not be able to navigate the conduit.

It should be understood that the above description, while indicating representative embodiments of the present disclosure, is given by way of illustration and not of limitation. Many changes and modifications may be made within the scope of the present disclosure without departing from the spirit thereof, and the present disclosure includes all such modifications.

Various additions, modifications, and rearrangements are contemplated as being within the scope of the following claims, which particularly point out and distinctly claim the subject matter regarded as the inventive concept, and it is intended that the following claims cover all such additions, modifications, and rearrangements.

One or more embodiments of the disclosure may be referred to herein, individually and/or collectively, by the term "invention" or "inventive concept" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

As used herein, the singular forms "a," "an," and "the" include plural referents unless the context clearly dictates otherwise.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the disclosure. The claims should not be read as limited to the described order or elements unless stated to that effect. Therefore, all embodiments that come within the scope and spirit of the following claims and equivalents thereto are claimed as the disclosure.

The invention claimed is:

1. A conduit lubricating device comprising:
a lubricant reservoir containing lubricant;
a hose having a stiffness configured to allow the hose to move through a conduit without collapse or permanent deformation, the conduit having an already installed wire or an at least partially installed wire; and
a pump having an inlet and an outlet,
wherein the inlet is fluidly coupled to the lubricant reservoir, and the outlet is fluidly coupled to the hose,
wherein the hose includes a dispensing end configured to spray the lubricant ahead of and away from the hose towards a desired location within the conduit, and
wherein the pump is configured to supply and drive the lubricant from the lubricant reservoir through the hose to lubricate the conduit to allow for installation and removal of wires in the conduit.

2. The conduit lubricating device of claim 1, wherein the hose has an outer diameter of less than or equal to 0.5 inch, and an inner diameter of less than or equal to 0.375 inch.

3. The conduit lubricating device of claim 2, wherein the outer diameter is 0.25 inch, and the inner diameter is 0.149 inch.

4. The conduit lubricating device of claim 3, wherein the hose exhibits a bending stiffness between 50 lb-ft./in. and 300 lb-ft./in.

5. The conduit lubricating device of claim 4, wherein the bending stiffness is between 220 lb-ft./in. and 230 lb-ft./in.

6. The conduit lubricating device of claim 1, wherein the hose is at least 25 feet long.

7. The conduit lubricating device of claim 1, wherein the hose is at least 50 feet long or at least 100 feet long.

8. The conduit lubricating device of claim 1, wherein the pump is configured to be manually operated.

9. The conduit lubricating device of claim 1, wherein the pump is configured to be electrically operated.

10. The conduit lubricating device of claim 1, wherein the pump is configured to be pneumatically operated.

11. The conduit lubricating device of claim 1, further comprising a spool configured to store and deploy the hose.

12. The conduit lubricating device of claim 11, wherein the spool comprises a handle.

13. The conduit lubricating device of claim 12, wherein the spool comprises an outer housing.

14. A conduit lubricating device comprising:
a lubricant reservoir containing lubricant;
a hose configured to be inserted into a conduit and configured to move through the conduit without collapse or permanent deformation, the conduit having an already installed wire or an at least partially installed wire, wherein the hose includes an outer diameter of less than or equal to 0.5 inch, and a length of at least 25 feet, and wherein the hose includes a dispensing end configured to spray the lubricant ahead of and away from the hose towards a desired location within the conduit;

a pump configured to be manually operated and having an inlet and an outlet, wherein the inlet is fluidly coupled to the lubricant reservoir, and the outlet is fluidly coupled to the hose, and wherein the pump is configured to supply and drive the lubricant from the lubricant reservoir through the hose to lubricate the conduit to allow for installation and removal of wires in the conduit; and a spool configured to store and deploy the hose, wherein the spool includes a handle, and an outer housing.

15. The conduit lubricating device of claim 14, wherein a stiffness of the hose allows the hose to be inserted into and traverse along the conduit.

16. A conduit lubricating device comprising:

a reservoir configured to store lubricant;

a hose having a stiffness configured to allow the hose to move through a conduit without collapse or permanent deformation, the conduit having an already installed wire or an at least partially installed wire, wherein the hose includes a dispensing end configured to spray the lubricant ahead of and away from the hose towards a desired location within the conduit; and a pump fluidly coupled to the reservoir and to the hose.

17. The conduit lubricating device of claim 16, further comprising a spool.

18. The conduit lubricating device of claim 16, wherein the pump is configured to be manually operated.

19. The conduit lubricating device of claim 16, wherein the pump is configured to be electrically operated.

* * * * *